(No Model.)
E. F. STECK.
DRY PIPE VALVE FOR FIRE EXTINGUISHING SYSTEMS.
No. 598,684. Patented Feb. 8, 1898.
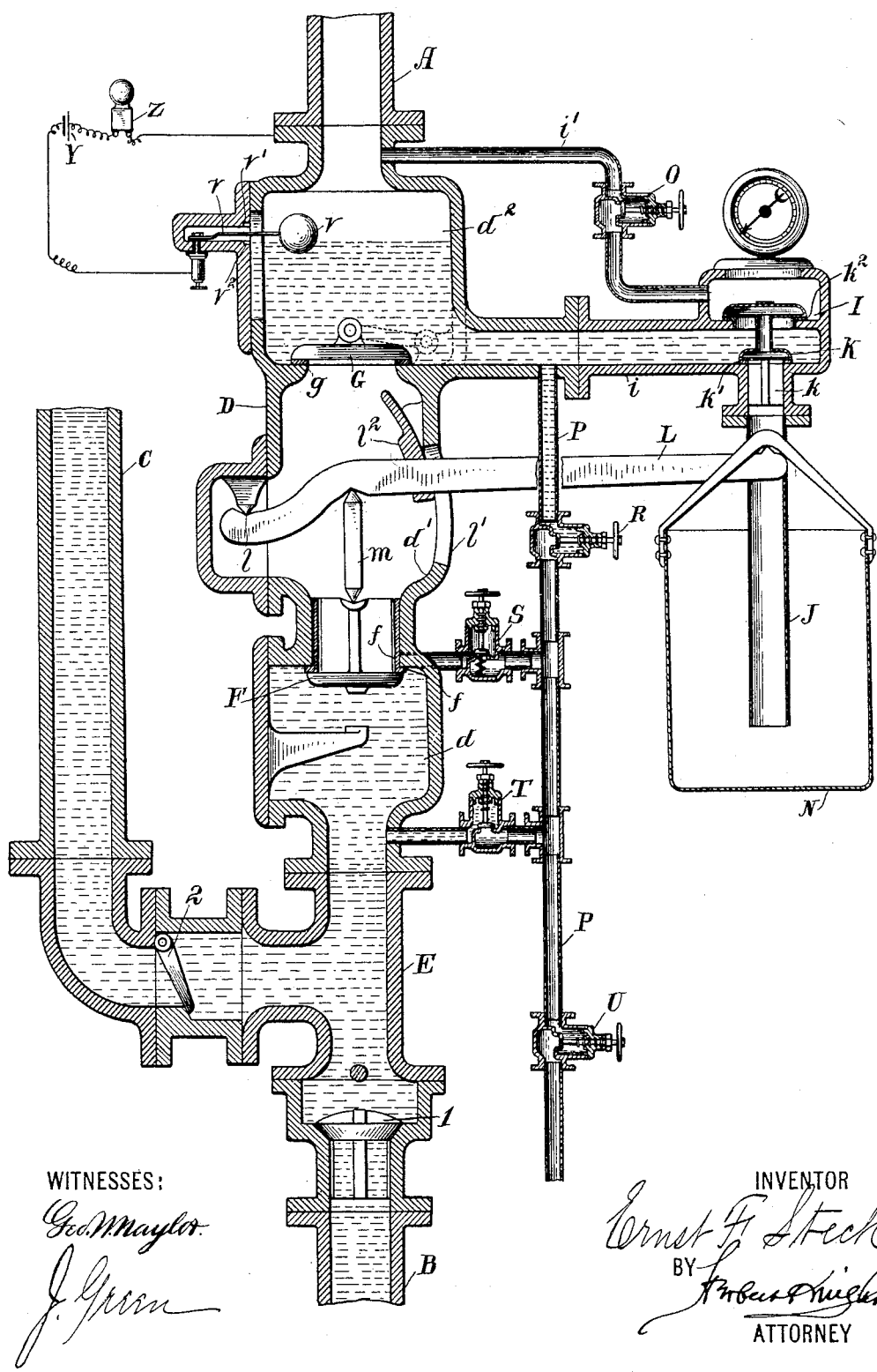
WITNESSES:
Geo. W. Naylor.
J. Green
INVENTOR
Ernst F. Steck
BY
Robert Knight
ATTORNEY
THE NORRIS PETERS CO., PHOTO-LITHO., WASHINGTON, D. C.

UNITED STATES PATENT OFFICE.

ERNST F. STECK, OF CHICAGO, ILLINOIS, ASSIGNOR TO THE FIRE EXTINGUISHER MANUFACTURING COMPANY, OF SAME PLACE AND NEW YORK, N. Y.

DRY-PIPE VALVE FOR FIRE-EXTINGUISHING SYSTEMS.

SPECIFICATION forming part of Letters Patent No. 598,684, dated February 8, 1898.

Application filed March 23, 1897. Serial No. 628,860. (No model.)

*To all whom it may concern:*

Be it known that I, ERNST F. STECK, a citizen of the United States, residing at Chicago, in the county of Cook and State of Illinois, have invented certain new and useful Improvements in Dry-Pipe Valves for Fire-Extinguishing Systems, of which the following is a specification.

This invention relates to improvements in dry-pipe valves for fire-extinguishing systems. In such systems the piping within the protected structure is normally dry and contains air under considerable pressure. The water-supply, which is generally furnished from at least two separate sources, is restrained from entering the dry pipes by valves constructed to operate, on a diminution of the air-pressure in said pipes, to open and allow the water to pass into the pipes.

My invention comprises a special construction of valve-releasing mechanism designed to operate with greater accuracy, efficiency, and promptness than those in general use, and my invention also comprises means for giving an alarm as the valves are released and maintaining the alarm after their release.

A further feature of my invention is an arrangement of check and by-pass valves whereby the valve-chambers may be drained or supplied with water, as desired, and I also provide special check-valves whereby on a breakage or stoppage of either of the two water-supplies the connection of the main valves with the defective supply is automatically and immediately cut off, while the connection with the other supply is established or maintained.

The accompanying drawing is a vertical section of a dry-pipe valve constructed according to my invention.

A is a pipe which is connected to the system of piping in a protected building.

B is a pipe leading to a source of supply, as a water-main, and C is a pipe leading to an auxiliary supply, such as a water-tank.

D is a vertical valve-casing containing or supporting the various parts hereinafter described and having the aforesaid pipes connected to it, the pipe A entering its upper end and the pipes B and C entering it at the lower end through a T-coupling or junction-pipe E.

The main valve F, shown partly in section and partly in elevation, fitted to slide vertically in the valve-casing, is held up against the valve-seat $f$ by the pressure of the water in the lower part of the casing, so as to close the communication between the pipes B and C and the pipe A.

Above the valve F is a clack or check valve G, normally resting against its seat $g$. The valve-casing D is thus divided by valves G and F into a lower chamber $d$, a middle chamber $d'$, and an upper chamber $d^2$. The lower chamber, being in direct connection with the supply-pipe, is always full of water under pressure, chamber $d'$ is normally empty, while chamber $d^2$ normally contains water up to a certain level, as indicated, and forms a water-chamber.

A chamber I is connected at its upper and lower parts to the water-chamber $d^2$ by pipes $i\,i'$, entering chamber $d^2$ at points respectively above and below the level of the water therein. In the bottom part or section of chamber I is a valve-opening $k$, normally closed by the valve K, resting against seat $k'$. This valve K is a double or balance valve having a lower part coöperating with valve-seat $k'$ and an upper part coöperating with valve-seat $k^2$. The upper valve-face is, as shown, a little larger than the lower one, so as to give a slight tendency to raise the valve, due to the pressure of the water in the lower part of chamber I. The valve K is preferably made of aluminium and also hollowed out, as shown, so as to make it on the whole lighter than water. If the air in pipe A and chambers $d^2$ and I were at atmospheric pressure, the valve K would be lifted by the water in chamber I on account of its flotative effect and of the difference in area of the valve-faces. The air in pipe A is, however, normally under considerable pressure, and this being applied to all parts of valve K except the face exposed to the opening $k$ the valve is forced toward said opening and keeps the same closed as long as this pressure is maintained. As soon as the pressure in the dry-pipe system is relieved, as by the opening of an automatic sprinkler, the valve K is lifted, as above described, and the water in chambers $d^2$ and I flows out through opening $k$ and a pipe J leading therefrom.

A lever L, pivoted at $l$ in the middle chamber $d'$ of the valve-casing, bears through a connecting link or bar $m$ against the main valve F and carries at its outer end a bucket N in position to catch the discharge from pipe J. Thus when the air-pressure in pipe A decreases the water in chamber I lifts valve K, passes out through opening $k$ and pipe J into bucket N, and by its weight forces down the lever L and opens the main valve F. The water from the supply-pipes then flows past the main valve, lifts the check-valve G, and flows through pipe A into the dry-pipe system. The lever L passes through and works in a slot $l'$ in the side of the valve-casing, and to close this slot when the main valve is opened, so as to prevent passage of water through the same, a shield or guard $l^2$ is attached to said lever L.

A hand-valve O, interposed in the pipe $i'$, enables the connection between pipe A and chamber I to be cut off, as in case it is desired to lower the pressure in the pipe A to enable repairs to be made, without releasing valve K.

P is a waste or drip pipe connected through hand-valve R with pipe $i$ and chambers $d^2$ and I, through a combined hand and check valve S with chamber $d'$ at a point just above valve-seat $f$, and through hand-valve T with chamber $d$. By opening valves R or T the water can be drained from chambers $d^2$ and I or from chamber $d$, as desired.

The pipe P can be closed by a valve U at a point below valve T, whereupon in opening valves R and T water can be forced from chamber $d$ to chambers $d^2$ and I and the lower part or section of chamber I.

The valve S is a spring-check valve set to close when the pressure comes on in chamber $d'$, but normally open, so that any water leaking from chamber $d$ or $d^2$ into chamber $d'$ will escape through pipe P.

A float V, carried by a flexible arm $v$, rests on the surface of the water in chamber $d^2$ and engages with contacts $v'$ or $v^2$ when the float rises or falls beyond a certain limit from the normal level. The arm $v$ and contacts $v'$ and $v^2$ are connected to an electric circuit including a battery Y and alarm Z. When the water falls in chamber $d^2$ on the opening of pressure-valve K, due to fall of pressure in the dry-pipe system, the electrical circuit will be closed and the alarm be sounded, and as the water rises in chamber $d^2$ and pipe A on the opening of the main valve F the alarm will again be sounded and will continue to ring as long as the water remains in the pipes.

Valves 1 and 2 are placed in pipes B and C to enable the connection with the said pipes to be maintained independently, so that if either of the sources of supply should give out connection with that pipe will be cut off and connection made or maintained with the other pipe. Both of these valves are check-valves and open outwardly—that is, toward the main valve—being closed against their seats when forced in the other direction. The pressure of the auxiliary supply through pipe C is made less than that of the main supply through pipe B, the pressures being, for example, seventy-five and one hundred pounds to the square inch, respectively. The valve 1 in pipe B normally rests lightly on its seat by its own weight only; but valve 2 is pressed to its seat by a pressure in the assumed case of twenty-five pounds per square inch.

In case a street-main should burst pressure in pipe B would be relieved, valve 1 would be held firmly against its seat, and the connection with pipe C through valve 2 will insure that the pressure in chamber $d$ will not fall below seventy-five pounds, which is sufficient to hold the main valve to its seat. If the main valve is now automatically opened, the pipe C will furnish the supply of water necessary. On the other hand, if the auxiliary supply-pipe C should burst valve 2 will be held firmly to its seat and the connection with the supply through pipe B will be maintained.

Having thus described my invention, what I claim as new, and desire to secure by Letters Patent, is—

1. In an automatic dry-pipe valve, the combination with a supply-pipe, dry pipe and main valve, of a chamber connected to the dry pipe, and having an outlet, a valve in said chamber controlling said outlet, a receiver placed below said outlet and a lever controlling the main valve and connected to said receiver.

2. In an automatic dry-pipe valve, the combination with a supply-pipe, dry pipe, and main valve, of a check-valve between the main valve and the dry pipe, a water-chamber above said check-valve, a chamber connected to said dry pipe and to the water-chamber and having an outlet, a pressure-valve controlling said outlet and adapted to be raised by the water in said chamber when the pressure in the dry pipe is relieved, and a lever controlling the main valve and carrying a receiver adapted to catch the discharge from said outlet.

3. In an automatic dry-pipe valve, the combination with a supply-pipe, dry pipe, and main valve, of a check-valve between the main valve and the dry pipe, a water-chamber above said check-valve, a chamber having an outlet connected to said water-chamber and to the dry pipe by separate pipes at points respectively below and above the water therein, a pressure-valve in said chamber, closing said outlet and having a portion separating the lower and upper parts of said chamber, a lever controlling the main valve and a receiver carried by said lever and adapted to receive the discharge from said opening.

4. In an automatic dry-pipe valve, the combination with a supply-pipe, dry pipe and main valve, of a check-valve between the main valve and dry pipe, a water-chamber above said check-valve, a chamber connected to said dry pipe and to the water-chamber and having an outlet, a valve in said chamber controlling said outlet, and mechanism controlling the main valve and actuated by the flow of water through said outlet.

5. In an automatic dry-pipe valve, the combination with a supply-pipe, dry pipe, and main valve, of a check-valve between the main valve and the dry pipe, a water-chamber above said check-valve, a chamber connected to said dry pipe and to the water-chamber and having an outlet, a pressure-valve controlling said outlet and adapted to be raised by the water in said chamber when the pressure in the dry pipe is relieved, and mechanism controlling the main valve and actuated by the flow of water through said outlet.

6. In an automatic dry-pipe valve, the combination with a supply-pipe, dry pipe, and main valve, of a check-valve between the main valve and the dry pipe, a water-chamber above said check-valve, a chamber having an outlet connected to said water-chamber and to the dry pipe by separate pipes at points respectively below and above the water therein, a pressure-valve in said chamber, closing said outlet and having a portion separating the lower and upper parts of said chamber, and mechanism controlling the main valve and actuated by the flow of water through said outlet.

7. The combination with dry pipe A, supply-pipes, chambers $d$, $d'$, $d^2$, main valve F, and check-valve G, of drain-pipe P connected through valves R and T with chambers $d$ and $d^2$ and through check-valve S with chamber $d'$.

8. The combination with dry pipe A, supply-pipes, chambers $d$, $d'$ $d^2$, main valve F, and check-valve G, of drain-pipe P having valve U and connected through valves R and T with chambers $d$ and $d^2$ and through check-valve S with chamber $d'$.

ERNST F. STECK.

Witnesses:
E. J. MITCHELL,
O. S. DOOLITTLE.